United States Patent [19]
Lye

[11] 3,920,928
[45] Nov. 18, 1975

[54] LINE CONTROL CIRCUIT

[75] Inventor: Stephen Walter Lye, Oaklandon, Ind.

[73] Assignee: Bell Telephone Laboratories, Incorporated, Murray Hill, N.J.

[22] Filed: Mar. 29, 1974

[21] Appl. No.: 456,372

[52] U.S. Cl. ................................ 179/99; 179/18 FA
[51] Int. Cl.$^2$ ........................................... H04M 1/00
[58] Field of Search ........ 179/99, 84 R, 81 R, 18 F, 179/18 FA

[56] References Cited

UNITED STATES PATENTS

| | | | |
|---|---|---|---|
| 3,484,754 | 12/1969 | Siuda | 179/18 FA |
| 3,604,857 | 9/1971 | Opferman | 179/99 |
| 3,715,516 | 2/1973 | Ebrahimi | 179/18 FA |
| 3,716,674 | 2/1973 | Manos | 179/18 FA |

*Primary Examiner*—Kathleen H. Claffy
*Assistant Examiner*—Gerald L. Brigance
*Attorney, Agent, or Firm*—H. L. Newman

[57] ABSTRACT

A key telephone system is disclosed that includes a clock for generating both flash and wink lamp signals and digital timing signals. The system also includes a plurality of line control circuits, each of which is associated with an individual telephone line and a plurality of key telephone sets, each of which is associated with one or more telephone lines. Thus the key telephone system includes a plurality of subsystems, each comprising a telephone line and the line circuit and elements of the key telephone sets associated with that telephone line. Each line circuit includes a ringing detector, loop current sensor, and hold bridge. In addition each line circuit includes a counter having a plurality of selected states that respectively correspond to individual operational modes of the subsystem. A first group of logic gates responds to the occurrence of conditions associated with a particular operation mode (i.e., presence of loop current and absence of A lead current associated with hold mode) by applying the digital timing signals of the clock to the counter and/or enabling the counter to be stepped in response to such signals toward the corresponding selected state. A second group of logic gates responds to the counter reaching that selected state, indicating the continuous existence of the associated conditions for a predetermined period of time, by placing the subsystem in the corresponding mode (i.e., applying hold bridge to the line and wink lamp signals to the sets).

22 Claims, 8 Drawing Figures

LINE CONTROL CIRCUIT

This invention relates to the field of key telephone systems and within that field to an arrangement which lends itself to use in a small business environment.

BACKGROUND OF THE INVENTION

Most subscribers served by multiple telephone lines find that the basic features that key telephone systems generally provide are quite desirable. These features consist of (1) visual signaling for indicating which of the lines is being rung, is in use, or on hold; (2) selective pickup for enabling the use of any of the lines from a single set; and (3) selective application of a hold bridge for allowing a subscriber busy on one line to hold the connection to that line and place or receive a call on another line. It is clear that these features greatly facilitate efficient use of multiple telephone lines, and this has resulted in widespread use of key telephone systems.

However, many small business subscribers whose needs are satisfied by four telephone lines or less serving twenty stations or less find that the key telephone systems presently available cost more than they wish to spend and/or require more space than they are able or willing to give up. The problem to be solved therefore is the design of a key telephone system for such a small business environment that is less expensive than existing equipment and occupies a small amount of space.

The present solution to this problem relies upon the use of electronic digital circuitry. The 60 Hertz power required to operate key telephone systems provides the basic timing function needed for such circuitry. In addition, such circuitry lends itself to integration which provides economies of both space and cost.

The use of digital circuitry in a key telephone system is disclosed in U.S. Pat. No. 3,604,857 issued to D.C. Opfermann, on Sept. 14, 1971. However, in that key telephone system, in addition to a line circuit or module being associated with each telephone line, a station module is associated with each station set, interconnection therebetween being accomplished by crosspoint modules. Furthermore, each station set must transmit and receive digital data signals and therefore special purpose rather than standard station sets must be used.

Finally, in that key telephone system, clock pulses are used to establish time slots, each of which is assigned a particular bit of information. The bits of information are transmitted in a particular sequence between each line module and the associated station modules and between each station module and its associated station set. In addition each line module is enabled in a particular sequence.

Each line module includes a 9 state counter and when a particular line module is enabled in its turn, the counter thereof is always stepped through all 9 states. The first 5 states serve to transmit information bits to the associated station modules, 4 of the 5 states causing enabling pulses to be applied to individual transmit logic gates that provide unique outputs dependent upon information bits received from the associated station modules during the previous advancement of the counter. The sixth state causes an enabling pulse to be applied to the associated crosspoint modules, while the last 3 states serve to receive information bits from the associated station modules, these 3 states causing enabling pulses to be applied to individual receive logic gates that provide unique outputs dependent upon information bits concurrently received from the associated station modules. The receive logic gates serve to set or reset memory flip-flops that provide inputs to the transmit logic gates during the next advancement of the counter.

A key telephone system of far less complexity is disclosed in the cofiled application, Ser. No. 456,390 of Louis D. Tate, assigned to the same assignee as the present invention. No station modules or crosspoint modules are required, and standard key telephone sets may be used. Furthermore, rather than continuously scanning the components of the system to determine whether conditions have changed, the system responds only when a change in conditions occurs and remains essentially quiescent during other times.

The key telephone system of Tate includes a clock for generating both flash and wink lamp signals and digital timing signals. The system also includes a plurality of line control circuits, each of which is associated with an individual telephone line and a plurality of key telephone sets, each of which is associated with one or more telephone lines. Thus the key telephone system includes a plurality of subsystems, each comprising a telephone line and the line circuit and elements of the key telephone sets associated with that telephone line. Each line circuit includes an electronic ring detector and hold bridge circuit and a magnetic line current sensor. In addition, each line circuit includes several counters. Each counter is activatable to a plurality of states, one of which corresponds to a particular operational mode (i.e., idle, hold) of the subsystem.

A first group of logic gates responds to the occurrence of conditions associated with a particular operational mode (i.e., presence of line current and absence of A lead current associated with hold mode) by applying the digital timing signals of the clock to one of the counters and/or enabling the counter to be advanced in response to such signals toward the state corresponding to that particular mode. A second group of logic gates responds to the counter reaching that corresponding state, indicating the continuous existence of the associated conditions for a predetermined period of time, by placing the subsystem in the particular mode (i.e., apply wink lamp signals to the sets at the same time that the hold bridge is applied to the associated telephone line).

SUMMARY OF THE INVENTION

A key telephone system in accordance with the present invention is an improvement over that of Tate in that it is basically the same but is of even greater simplicity. The line circuit of the present invention employs only a single counter. This counter has a plurality of selected states, each of which corresponds to an individual operational mode. The counter is advanced toward a particular selected state responsive to the occurrence of the conditions associated with the corresponding operational mode. When the counter reaches that particular selected state, the subsystem is placed in the corresponding mode.

The present line circuit also differs from that of Tate in that essentially a simple relay is used as the ringing detector, the timing function provided by the counter being used to distinguish between ringing voltage and other signals on the telephone line. Furthermore the present line circuit uses the ringing envelope (typically 2 sec on an 4 sec off) to apply a locally generated audible signal to each of the associated telephone sets in accordance with that envelope.

DETAILED DESCRIPTION OF THE INVENTION

Figure 1:
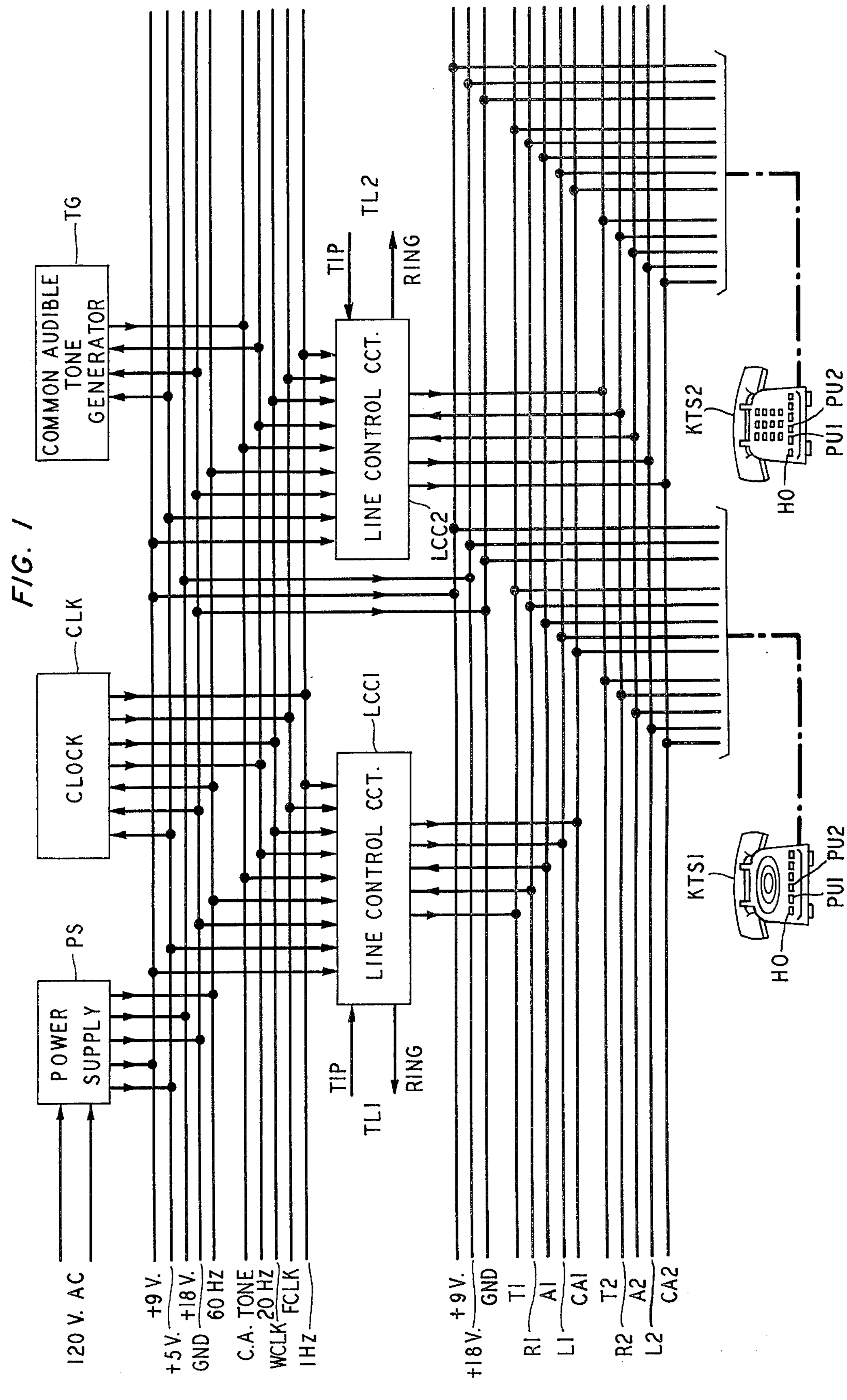
FIG. 1 is a block diagram of a key telephone system in accordance with the present invention.

In the description that follows the first digit of the reference number of each component refers to the drawing figure number where that component is shown.

Referring now to FIG. 1 of the drawing, a key telephone system in accordance with the present invention includes a power supply PS, a clock CLK, and a common audible tone generator TG, all of which are common to a plurality of line control circuits, two of which, LCC1 and LCC2, are shown. Each line control circuit is associated with an individual telephone line and a plurality of key telephone sets, two of which, KTS1 and KTS2, are shown. Since no dial register is required in this system, the telephones may be a mixture of rotary and pushbutton dial sets.

All of the key telephone sets are wired identically, that is, the corresponding button in each set has the same function or telephone line associated therewith. Thus the first button in each set is the hold button HO, the second button in each set is the pickup button PU1 for line 1, the third button in each set is the pickup button PU2 for line 2, and so on. As a result, the interconnecting cable is the same everywhere in the system eliminating the need for a cross connect field. Since the system includes a common audible tone generator for providing the ringing signal, each key set also includes a speaker from which the tone ringing signal is emitted.

As indicated in FIG. 1 the power supply PS operates off of standard 110 volt 60 Hertz ac power, and it provides well regulated positive 5 volt dc power and ground for the other components of the key system. In addition, the power supply PS includes means such as a Schmitt trigger circuit to convert 18 volt 60 Hertz sinusoidal ac to 5 volt 60 Hertz squarewave ac that provides a timing signal for the logic of both the clock CLK and the line control circuits LCC1 and LCC2. Finally, the power supply PS provides positive 9 volt full wave rectified unfiltered dc and positive 18 volt full wave rectified filtered dc to the key telephone sets KTS1 and KTS2 associated with the system. The former voltage is used for illumination of light emitting diode line lamps while the latter voltage is used for A lead and speaker power.

Figure 2:
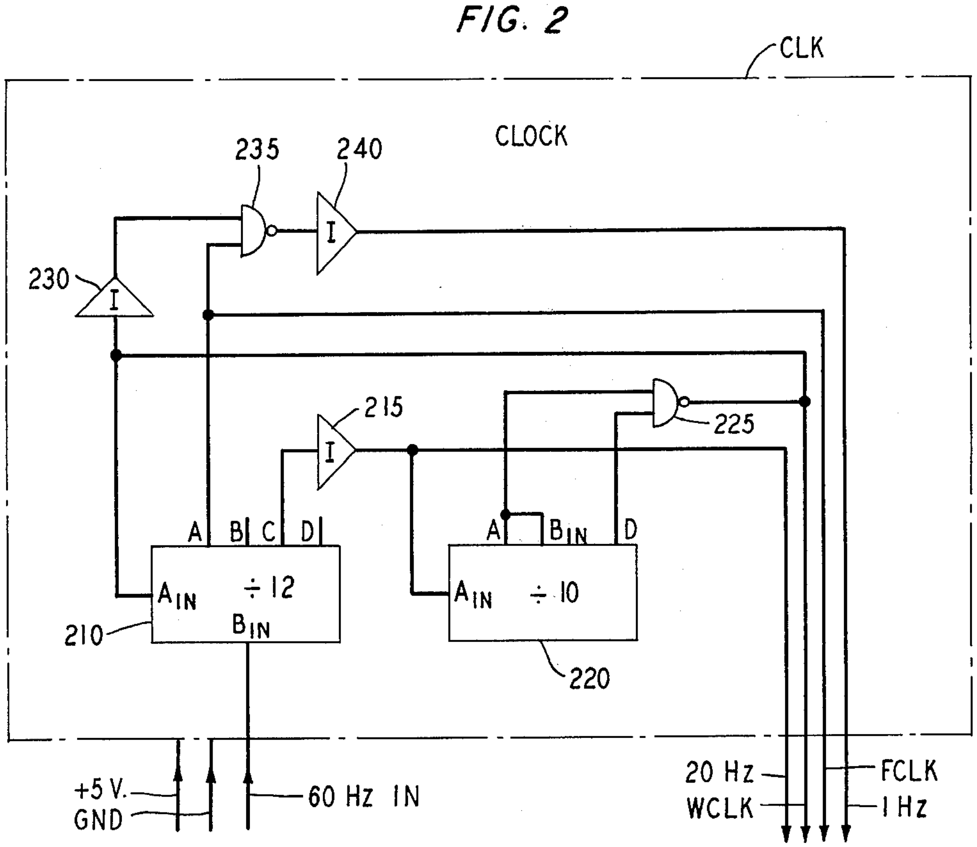
FIG. 2 is a schematic logic diagram of the clock used in the key telephone system.

As shown in FIG. 2, the clock CLK includes a divide by 12 counter 210, and the 60 Hertz timing signal of the power supply PS is applied to input B thereof. By applying the signal to input B and taking the signal from output C, the divide by 3 stage of the counter 210 is used to obtain a 20 Hertz signal having 33 msec at 0 and 17 msec at 1. This is changed by an inverter 215 to 33 msec at 1 and 17 msec at 0 to provide a timing signal for the logic of the line control circuits LCC1 and LCC2. This timing signal is also applied to the input of a decade counter 220, the A and D outputs of which are connected to a NAND gate 225. The output of gate 225 provides a 2 Hertz wink clock signal WCLK having 450 msec at 1 and 50 msec at 0 so as to provide the proper timing to control lamp wink rates in accordance with generally accepted standards.

The 2 Hertz output of gate 225 is also applied to input A of counter 210. By taking the signal from output A of counter 210, the divide 2 stages of the counter is used to obtain a 1 Hertz flash clock signal FCLK having 500 msec at 1 and 500 msec at 0 so as to provide the proper timing to control the lamp flash rate in accordance with generally accepted standards. The flash clock signal FCLK along with the wink clock signal WCLK inverted by inverter 230 are applied to a NAND gate 235 and the output of the gate applied to an inverter 240 to obtain a 1 Hertz timing signal having 50 msec at 1 and 950 msec at 0.

Figure 3:
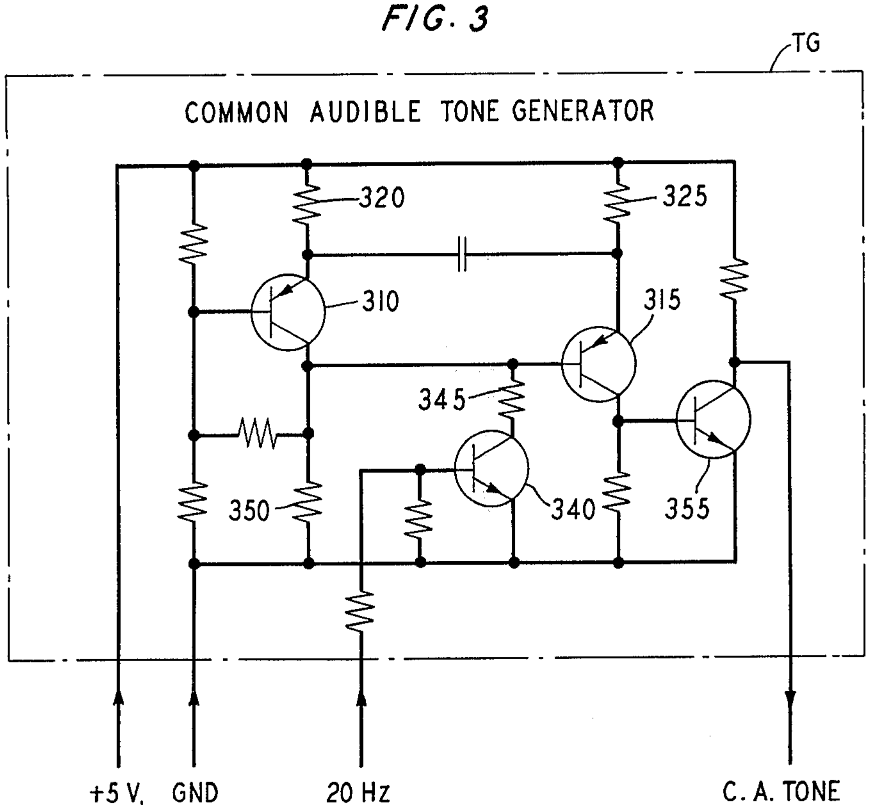
FIG. 3 is a schematic circuit diagram of the common audible tone generator used in the key telephone system.

Referring now to FIG. 3, a common audible tone generator TG adopted for use in the key telephone system includes a pair of transistors 310 and 315 which form an emitter coupled oscillator. The duty cycle of the oscillator is determined by emitter resistors 320 and 325, and its output is essentially a squarewave. The frequency of the oscillator is shifted by the turning on and off of transistor 340 responsive to the 20 Hertz timing signal. When turned on, transistor 340 connects collector resistor 345 in parallel with collector resistor 350 whereby the frequency is increased. The resulting fluctuation in frequency produces a warbling tone that is both pleasing and attention getting. Transistor 355 serves as a buffer, amplifier, and level shifter to provide true logic levels.

Figures 7, 8:
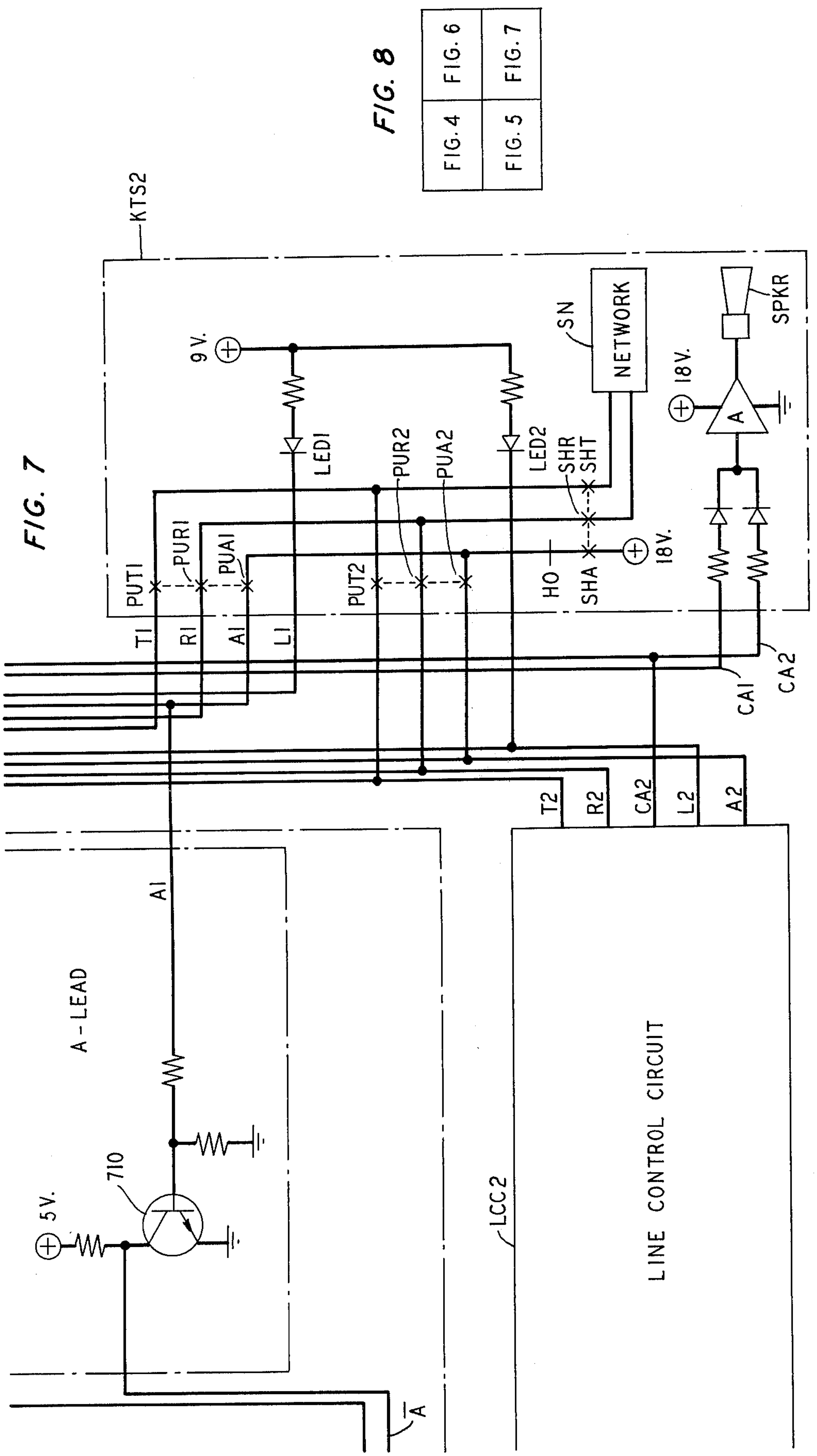
FIG. 8 is a diagram showing the arrangement of FIGS. 4 through 7.

Referring now to FIGS. 4, 5, 6, and 7, which are arranged in accordance with FIG. 8, the line control circuit LCC1 is associated with telephone line TL1 and elements of key telephone sets KTS1 and KTS2, and this combination comprises a subsystem of the key telephone system. Similarly, the line control circuit LCC2 is associated with telephone line Tl2 and elements of key telephone sets KTS1 and KTS2, and this combination comprises another subsystem of the key telephone system. Each subsystem has a plurality of operational modes, i.e., idle, ringing, in-use, and hold, and each subsystem can be in a different operational mode.

The line control circuits LCC1 and LCC2 are identical and therefore only line circuit LCC1 and its associated subsystem will be described in detail. It is to be understood that the description of LCC1 applies to LCC2 and all other line control circuits in the present system. The line control circuit LCC1 includes a ringing detector RGD, a line current sensor LCS, and a hold bridge circuit HBC, all shown in FIG. 4. The ringing detector RGD comprises a resistor, varistor, and capacitor, connected in series with a relay winding RDR across the tip and ring conductors T1 and R1 of the telephone line TL1. The values of these components are selected so that the impedance is essentially the same as the ringer of a telephone set. The application of ringing voltage to the telephone line TL1 causes contacts RD of relay RDR to close and open twice during each cycle, so that when 20 Hertz ringing voltage is applied, the contacts RD provide 40 closures per second.

The line current sensor LCS comprises a pair of relay windings CSRT and CSRR respectively connected in series with the tip and ring conductors T1 and R1 of the telephone line TL1. The windings CSRT and CSRR are series aiding, and when line current is applied to windings, relay contacts CS are held closed. In a similar manner, the hold bridge circuit HBC includes a relay winding HBR that when energized closes relay contacts HB. These contacts connect a resistor 405 across the tip and ring conductors T1 and R1 behind the line current sensor LCS to provide the dc path during the hold operational mode.

Figure 4:
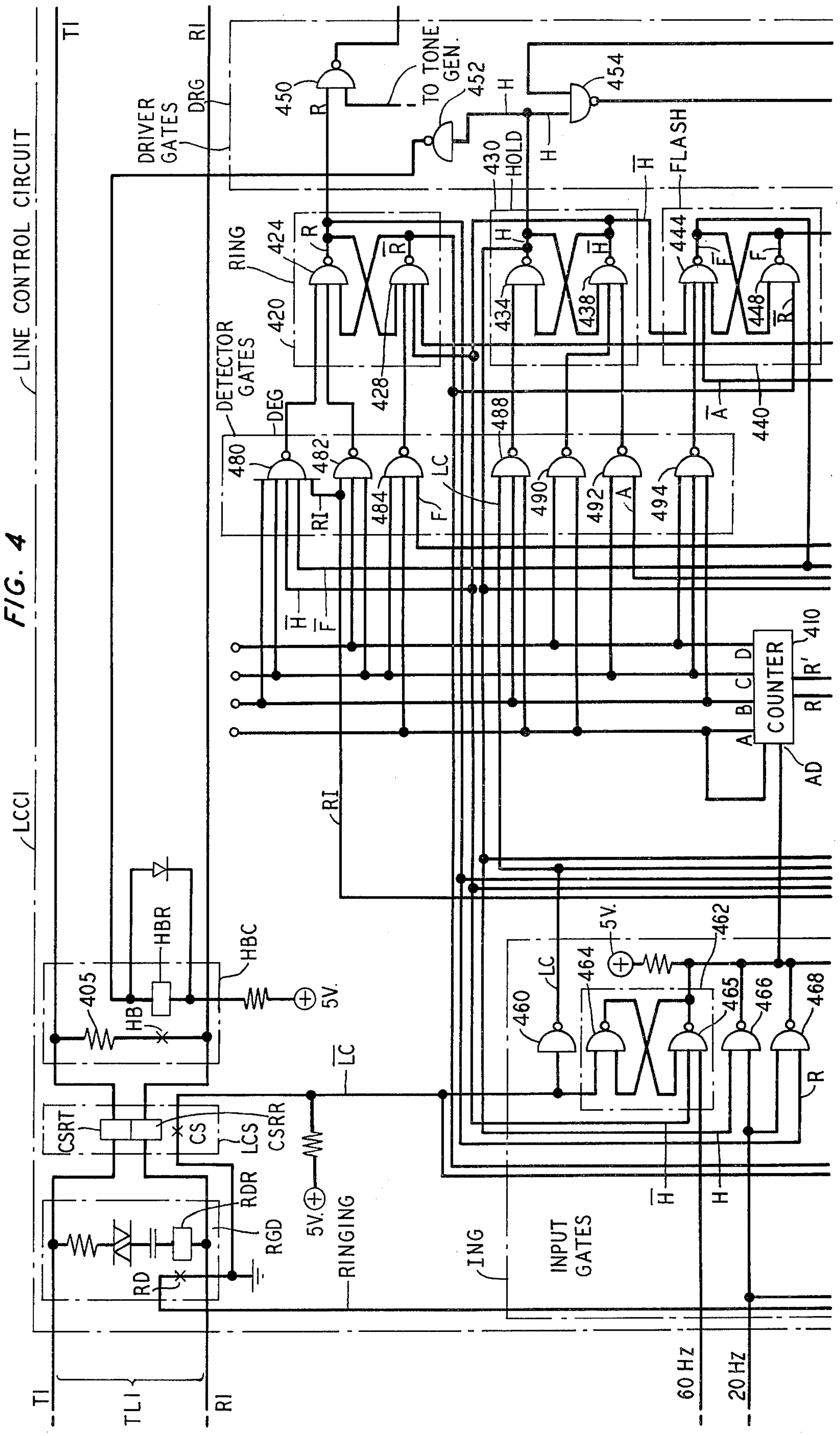
FIGS. 4 through 7 present a schematic circuit diagram of the subsystems of the key telephone system, each comprising a line control circuit and the telephone line and key telephone sets associated therewith.
Figure 5:
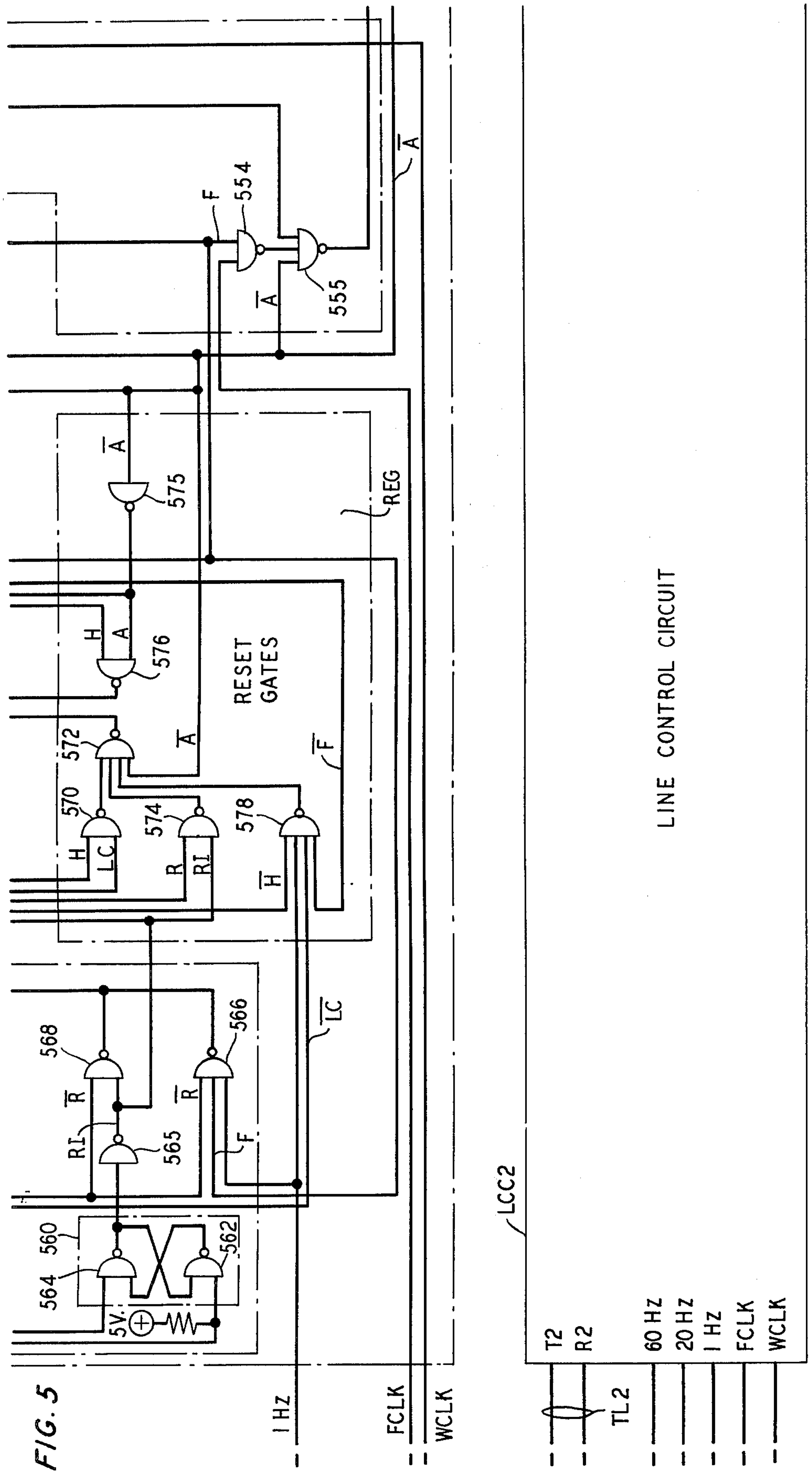
Figure 6:
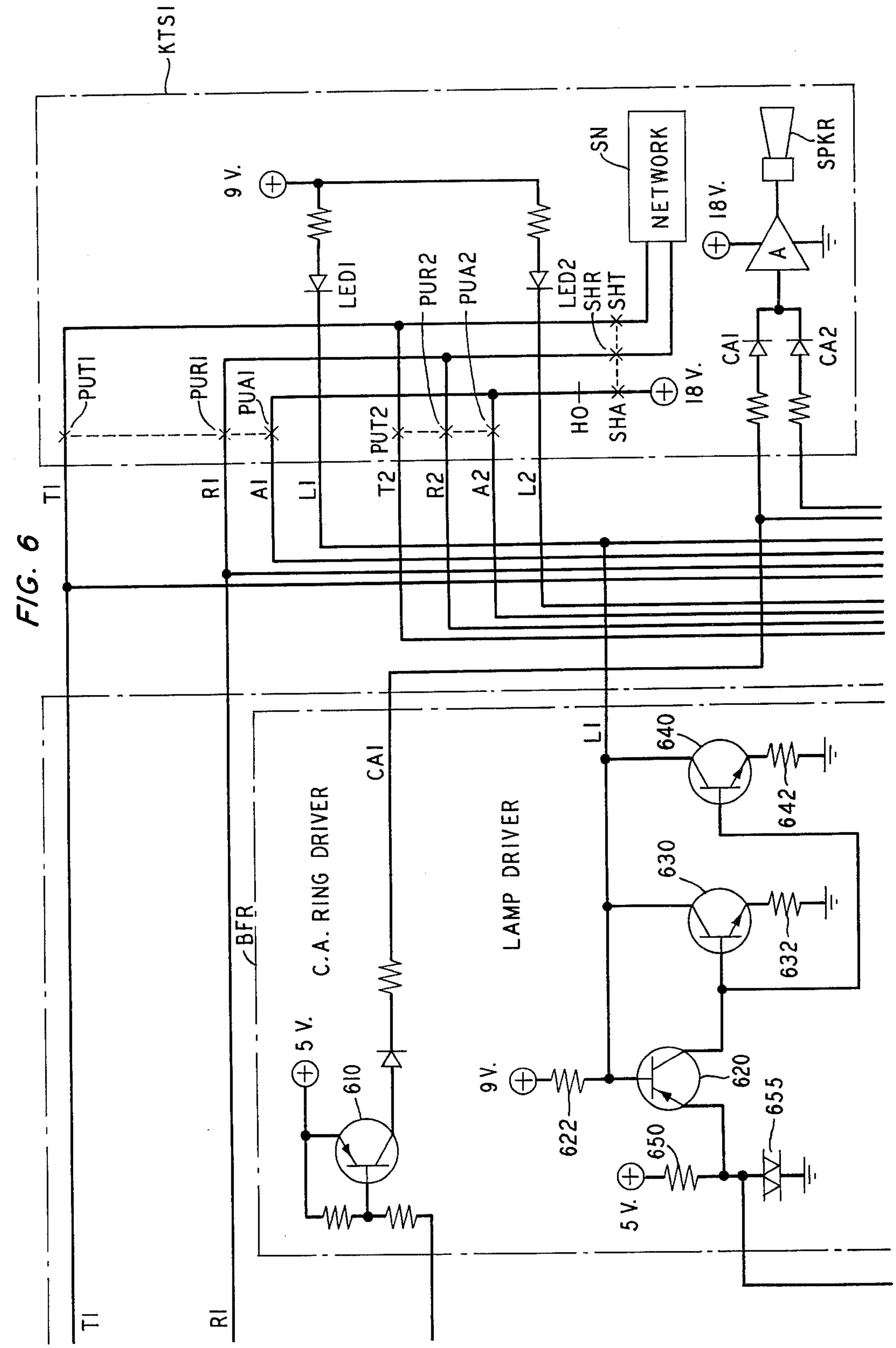

The line control circuit LCC1 further includes a logic circuit shown in FIGS. 4 and 5. The logic circuit comprises a 4 bit binary counter 410, a group of input gates ING that generally serve to advance the counter at various rates, a group of reset gates REG that serve to reset the counter to 0 count, and a group of detector gates DEG that respond to the counter being advanced to a selected state. The logic circuit also includes a ring flip-flop 420, hold flip-flop 430, and flash flip-flop 440 that respond to the output of the detector gates DEG and a group of driver gates DRG that respond to the outputs of the flip-flops to place the subsystem in various operational modes. The final major component of the line control circuit LCC1 comprises a buffer circuit BFR, shown in FIGS. 6 and 7, which serves as an interface between the logic circuit and the key telephone sets.

With this background we shall now describe each of the operational modes of the subsystem incorporating line control circuit LCC1. When reference is made to the input leads of gates, the numbering is from top to bottom or from left to right as the case may be.

IDLE MODE

When the subsystem is in the idle operational mode, the key telephone sets KTS1 and KTS2 are either on hook whereby the switch hook contacts SHT, SHR, and SHA are open or the pickup button PU1 for the telephone line TL1 is unoperated whereby the pickup contacts PUT1, PUR1, and PUA1 are open. As a result, the voltage on what is commonly referred to as the A lead and what is herein referred to as the signal lead A1 is not applied to the base of buffer transistor 710 to turn it on. The collector of buffer transistor 710 therefore rides high and a 1 is applied to lead $\overline{A}$ of the logic circuit.

In addition, for reasons that will become clear as the description proceeds, the ring flip-flop 420, hold flip-flop 430, and flash flip-flop 440, are all in the reset condition. Consequently, ring gate 424 of the ring flip-flop 420 applies a 0 to lead R while $\overline{\text{ring}}$ gate 428 applies a 1 to lead $\overline{R}$; hold gate 434 of the hold flip-flop 420 applies a 0 to lead H while $\overline{\text{hold}}$ gate 438 applies a 1 to lead $\overline{H}$; and flash gate 444 of the flash flip-flop 440 applies a 0 to lead F while $\overline{\text{flash}}$ gate 448 applies a 1 to lead $\overline{F}$.

As a result of the foregoing, all of the driver gates DRG are disabled. The 0 on lead R is applied to the first input of ringer driver gate 450 and therefore the common audible tone ringing signal CA continuously applied to the second input lead of the gate does not pass through the gaet and through the buffer BFR to speakers SPKR of key telephone sets KTS1 and KTS2. The 0 on lead H is inverted to a 1 by hold relay driver gate 452 and therefore the hold relay HBR is not energized to close contacts HB and thereby apply the hold bridge across the telephone line TL1. In addition, the 0 on lead H is applied to the first input lead of the wink driver gate 454 while the 0 on lead F is applied to the second input lead of flash driver gate 554. Therefore the wink clock signal WCLK and flash clock signal FCLK respectively present on the other input leads of these gates do not pass through these gates to lamp driver gate 555. Furthermore, since the outputs of wink driver gate 454 and flash driver gate 554 is a 1 and a 1 is present on lead $\overline{A}$, the output of lamp driver gate 555 is a 0 whereby line lamps LED1 in the telephone sets KTS1 and KTS2 are not illuminated.

Since the hold bridge is not applied to the telephone line TL1, and speech networks SN of the key telephone sets KTS1 and KTS2 are not connected across the telephone line TL1, line current is not present on tip and ring conductors T1 and R1 and contacts CS of the current sensor LCS are open. A 1 is therefore applied to lead $\overline{LC}$ of the logic circuit, the 1 being inverted to a 0 by input gate 460 and applied to lead LC. Furthermore, since ringing voltage is not being applied to telephone line TL1, the contacts RD of the ringing detector RGD remain open. As a result, a 1 is applied to gate 562 of ring input flip-flop 560, whereby the flip-flop is in a reset condition. It does not, therefore, respond to the 20 Hertz timing signal applied to gate 564 and the output of the flip-flop is a 1 which is inverted by input gate 565 to a 0 and applied to lead RI of the logic circuit.

This combined with the ring, hold, and flash flip-flop being in the reset condition results in the rest of the input gates ING except for one being disabled. The 1 on lead $\overline{LC}$ applied to gate 464 of current input flip-flop 462 places the flip-flop in the reset condition whereby it does not respond to the 60 Hertz timing signal applied to gate 465 thereof. Similarly, the 0 on lead H and on lead R respectively prevent the 20 Hertz timing signal applied to input gates 466 and 468 from passing through the gates to the counter 410. In like manner the 0 on lead F prevents the 1 Hertz timing signal applied to input gate 566 from being applied to the counter 410. Input gate 568 is the only input gate that is not disabled, and it stands ready to respond to the ringing detector.

Finally, as a result of the foregoing, the reset gates REG maintain the counter at 0 count. The 0 on lead H and on lead LC result in reset gate 570 having a 1 output that is applied to reset gate 572. Similarly, the 0 on lead R and on lead RI result in reset gate 574 having a 1 output that is applied to reset gate 572. Furthermore, the 1 on lead $\overline{A}$ is also applied to reset gate 572 and inverted to a 0 by reset gate 575 and applied along with the 0 lead H to reset gate 576. Thus, reset gate 576 applies a 1 to reset input R′ of the counter 410, while reset gate 572 is conditioned to respond to the output of reset gate 578. Since a 1 appears on lead $\overline{H}$, lead $\overline{LC}$, and lead $\overline{F}$, reset gate 578 responds to the 1 Hertz timing signal (50 msec at 1 - 950 msec at 0) to apply a 0 to a reset gate 572 once a second. Reset gate 572 in turn applies a 1 to reset input R of the counter 410, and when a 1 is present on both reset inputs R and R′ of the counter, it is reset to the 0 count. Therefore should some spurious signals on telephone line TL1 cause the ringing detector contacts RD to close and in the manner hereinafter described cause the counter to advance out of the 0 count, it is reset back to the 0 count once each second, and the subsystem is maintained in the idle mode.

RINGING MODE

When 20 Hertz ringing voltage is applied to the telephone line TL1, the ringing relay RDR of the ringing detector RGD is energized to close and open the contacts RD during each half cycle. The closure of contacts RD applies a 0 to gate 562 of the ring input flip-flop 560, and if at the same time a 1 is applied to gate 564 of the flip-flop by the 20 Hertz timing signal (33 msec 1 – 17 msec 0), the flip-flop is set. The output of the ring input flip-flop 560 in the set condition is a 0, which is inverted to a 1 by input gate 565 and applied to input gate 568 and to lead RI. Since lead $\bar{R}$ is also a 1, the input gate 568 applies a 0 to advance input AD of the counter 410 whereby the counter is advanced to the first count. A subsequent opening of the contacts RD while the 20 Hertz timing signal is applying a 0 to gate 564 of the ring input flip-flop 560 then resets the flip-flop. Thus it is seen that the 20 Hertz timing signal modulates the ringing signal so that the counter is advanced at a rate no greater than 20 Hertz.

When the counter 410 advances to the sixth count, which takes approximately 300 msec, a 1 appears on outputs B and C thereof and this combination with the 1 on leads $\bar{H}$ and $\bar{F}$ and RI enables detector gate 480. The 0 output of detector gate 480 is applied to ring gate 424 of the ring flip-flop 420 and the flip-flop is set whereby a 1 is applied to lead R and a 0 is applied to lead $\bar{R}$. The 1 on lead R enables ringer driver gate 450 to pass the squarewave tone signal applied to the other input lead of the gate to the base of transistor 610 of the buffer circuit BFR. The transistor 610 turns on and off at the same frequency as the tone signal and thereby applies the signal to each of the key telephone sets KTS1 and KTS2 where it is amplified and then made audible by the speakers SPKR in each set. Blocking diodes in the path between the transistor 610 and the speakers SPKR prevent damaging voltages from being applied to the transistor and logic circuit.

In addition to enabling the ringer driver gate 450, the 1 on lead R enables input gate 468 to apply the 20 Hertz timing signal to the advance input AD of the counter 410. However the 1 on lead R also enables reset gate 574 to respond to the output of the ring input flip-flop 560. Thus each time the ring input flip-flop 560 is set in response to the continued application of ringing voltage to the telephone line TL1, a 1 is applied to lead RI. Reset gate 574 thereupon applies a 0 to gate 572 which in turn applies a 1 to the reset input R of the counter 410. Since a 1 is already applied to reset input R', the counter 410 is reset to 0 count and held there as long as ringing voltage continues to be applied to telephone line TL1.

At the same time, the 0 on lead $\bar{R}$ is applied to input gates 566 and 568 and flash gate 448 of the flash flip-flop 440. The input gates are thereby disabled while the flash flip-flop 440 is set, resulting in a 1 being applied to lead F and a 0 being applied to lead $\bar{F}$. The 1 on lead F enables the flash driver gate 554 to apply the flash clock signal FCLK (500 msec 1 - 500 msec 0) to lamp driver gate 555 which in turn applies the signal to the emitter of buffer transistor 620. The voltage applied to the base of transistor 620 is the same as that applied to the lamps LED1 and LED2 in the key telephone sets KTS1 and KTS2, that is, full wave rectified unfiltered positive 9 volts, and when the voltage goes to 0 following the application of a logic 1 to the emitter of the transistor, base current is able to flow to the 0 voltage source through resistor 622. This then allows collector current from transistor 620 to flow into the bases of transistors 630 and 640 so that these two transistors turn on with the next rise in the voltage cycle. Current thereupon flows through the line lamps LED1 of the key telephone sets KTS1 and KTS2, and the lamps are illuminated. When thereafter a logic 0 is applied to the emitter of transistor 620, it turns off whereupon transistors 630 and 640 turn off and the line lamps LED1 are extinguished. Thus the line lamps LED1 turn on and off in accordance with the flash clock signal FCLK to provide a visual signal for indicating that ringing is occurring on telephone line TL1.

If the current level in this lamp circuit rises too high, as from an overload from some source, the voltage across emitter resistors 632 and 642 builds up to the point where the collector voltage also rises. The base voltage of transistor 620 is thereby effected, and when it exceeds a level determined by resistor 650 and varistor 655, transistor 620 turns off. This in turn causes transistors 630 and 640 to turn off and thus overload protection is provided.

In addition to enabling the flash driver gate 554, the 1 on lead F partially enables input gate 566 and detector gate 484, while the 0 on lead $\bar{F}$ disables reset gate 578 and detector gate 480.

When ringing voltage is removed from the telephone line TL1, which other than when the called party answers occurs either because the ringing generator in the central office is providing the silent interval between ringing bursts or because the calling party has hung up, the ring input flip-flop 560 returns to the reset condition. A 0 is then applied to lead RI whereby reset gate 574 applies a 1 to reset gate 572, and since all other inputs to reset gate 572 are a 1, the counter 410 is no longer held at 0 count. Rather the counter 410 is advanced by the 20 Hertz timing signal applied by input gate 468. When the counter 410 reaches the count of 5, which takes approximately 250 msec, a 1 appears on outputs A and C thereof and this in combination with the 1 on lead F enables detector gate 484. The 0 output of detector gate 484 is applied to ring gate 428 and the ring flip-flop 420 is reset, whereby a 0 is again applied to lead R and a 1 to lead $\bar{R}$.

The 0 on lead R disables ringer driver gate 450 to terminate the application of tone ringing to the speakers SPKR of telephone sets KTS1 and KTS2, while flashing of the line lamps LED1 continues. The 0 on lead R also disables input gate 468 to terminate the advancement of the counter 410 at the 20 Hertz rate. However, the 1 on lead $\bar{R}$ in combination with the 1 on lead F enables input gate 566 to advance the counter 410 responsive to the 1 Hertz timing signal. In addition, the 1 on lead $\bar{R}$ partially enables input gate 568.

If ringing voltage was removed to provide the typical 4 sec silent interval between ringing bursts, then when ringing voltage is again applied, the counter 410 will have advanced to about count 9. As with the first application of ringing voltage, the counter 410 is again advanced at a 20 Hertz rate, and when it gets to the count of 12, a 1 is applied to outputs C and D thereof. Since a 1 is also being applied intermittently to lead RI responsive to ringing voltage, detector gate 482 is enabled. Detector gate 482 applies a 0 to ring gate 424 of the ring flip-flop 420 and the ring flip-flop is again placed in the set condition, whereby the tone ringing signal is again applied to the key telephone sets KTS1 and KTS2 and the counter 410 is again reset to 0 count.

Thus it is seen that the ringing mode actually comprises two modes. One is ringing and flashing and the other is just flashing.

If, on the other hand, ringing voltage was removed from the telephone line TL1 because the calling party has hung up, the counter 410 will continue to advance at the 1 Hertz rate until it gets to the count of 14. At that count a 1 is applied to outputs B, C, and D of the counter and detector gate 494 is enabled whereupon a 0 is applied to $\overline{\text{flash}}$ gate 444 of the flash flip-flop 440 and the flip-flop is reset. The flashing of the line lamps LED1 of the key telephone sets KTS1 and KTS2 in accordance with the flash clock signal FCLK is terminated and the subsystem is returned to the idle mode wherein the counter 410 is reset to the 0 count by the 1 Hertz timing signal applied to reset gate 578.

IN-USE-MODE

When either of the key telephone sets KTS1 or KTS2 goes off hook with the pickup button PU1 operated, the telephone line TL1 is seized. Assuming for example that key telephone set KTS1 has gone off hook with its pickup button PU1 operated, whereby switch hook contacts SHT, SHR, and SHA and pickup contacts PUT1, PUR1, and PUA1 are all closed, a path is provided from the central office on tip conductor T1, through relay winding CSRT of the line current sensor LCS and through pickup contacts PUT1 and switch hook contacts SHT to the speech network SN of key telephone set KTS1. From the speech network SN the path extends through switch hook contacts SHR and pickup contacts PUR1 and through relay winding CSRR of the line current sensor LCS back out to the central office on ring conductor R1. Thus the speech network SN of key telephone set KTS1 is connected across the telephone line Tl1 and as indicated previously, the presence of line current on relay windings CSRT and CSRR of the line current sensor LCS closes relay contacts CS whereby a 0 is applied to lead $\overline{\text{LC}}$.

At the same time a path is completed from the 18 volt source of the power supply through switch hook contacts SHA, hold contacts HO, and pickup contacts PUA1, of the signal lead A1 to the base of transistor 710 in the buffer circuit BFR. Transistor 710 is thereby turned on and O is applied to lead $\overline{\text{A}}$ of the logic circuit.

The 0 on lead $\overline{\text{LC}}$ is applied to gate 464 of current input flip-flop 462. The current input flip-flop 462 is thereby set in which condition gate 465 is enabled to apply the 20 Hertz timing signal to the advance input AD of counter 410. However at the same time the 0 on lead A is applied to reset gate 572, the gate in turn applies a 1 to reset input R of the counter 410. Since a 1 is already present on reset input R' of counter 410, the counter is reset to and held at the 0 count. In addition the 0 on lead $\overline{\text{A}}$ is applied to lamp driver gate 555, and thus the gate applies a 1 to the emitter of transistor 620 in the buffer circuit BFR. In the same manner as described above with respect to the ringing mode, the presence of the logic 1 at the emitter of transistor 620 turns on line lamps LED1 of the key telephone sets KTS1 and KTS2. The resulting steady illumination of the lamps LED1 provides a visual signal that telephone line TL1 is in use.

The 0 on lead $\overline{\text{A}}$ is also applied to $\overline{\text{ring}}$ gate 428 of the ring flip-flop 420 and the $\overline{\text{flash}}$ gate 444 of the flash flip-flop 440. Thus if the subsystem has been in the ringing mode when telephone line TL1 was seized, both the ring flip-flip 420 and flash flip-flop 440 would be immediately reset to respectively terminate the application of tone ringing signal to the speakers SPKR of the key telephone sets KTS1 and KTS2 and to terminate the flashing of the line lamps LED1 of the key telephone sets. In addition, the 0 on lead $\overline{\text{LC}}$ is inverted to a 1 by input gate 460 and applied on lead LC to reset gate 570 and detector gate 488, whereby the logic circuit is prepared to respond to a request for hold.

HOLD MODE

To place the telephone line TL1 on hold, the hold button HO (FIG. 1) of the key telephone set KTS1 is operated whereby the hold contacts HO (FIG. 7) are opened. Voltage is thereby removed from the signal lead A1 and the buffer transistor 710 turns off, resulting in a 1 being applied to lead $\overline{\text{A}}$. The output of lamp driver gate 555 then becomes a 0 and buffer transistor 620 turns off extinguishing line lamps LED1 in the key telephone sets KTS1 and KTS2. In addition, the 1 on lead $\overline{\text{A}}$ changes the output of reset gate 572 to a 0, resulting in the counter 410 no longer being held to the 0 count. The counter 410 then advances responsive to the 60 Hertz timing signal applied by gate 465 of the current input flip-flop 462 to advance input AD of the counter. When the counter 410 reaches the count of 3, which takes approximately 42 msec, a 1 appears on outputs A and B thereof. This combined with the 1 on lead LC enables detector gate 488, whereby a 0 is applied to hold gate 434 of the hold flip-flop 430. The hold flip-flop 430 is thereby set in which condition a 1 is applied to lead H and a 0 is applied to head $\overline{\text{H}}$.

The 1 on lead H enables wink driver gate 454 to pass the wink clock signal (450 msec 1 — 50 msec 0) to the lamp driver gate 555, and in the same manner as described with respect to the application of the flash clock signal during the ringing mode, the line lamps LED1 of the key telephone sets KTS1 and KTS2 are caused to turn on and off in accordance with the wink clock signal. The winking of the lamps thereby provides a visual indication that telephone line TL1 is on hold. In addition the 1 on lead H enables input gate 466 to apply the 20 Hertz timing signal to advance input AD of the counter 410. However, the 1 on lead H in combination with the 1 present on lead LC enables reset gate 570 and the 0 output of the gate results in reset gate 572 applying a 1 to reset input R of the counter 410. The counter 410 is thereby reset to and held at 0 count.

At the same time the 1 on lead H is applied to hold relay driver gate 452 and the resulting 0 on the output of the gate energizes hold bridge relay HBR. The energized relay closes contacts HB and thereby connects the hold bridge consisting of resistor 405 across telephone line TL1.

The 0 on lead $\overline{\text{H}}$ is applied to $\overline{\text{ring}}$ gate 428 of the ring flip-flop 420 and flash gate 444 of the $\overline{\text{flash}}$ flip-flop 440. The ring flip-flop 420 and flash flip-flop 440 are thereby held in the reset condition respectively preventing the application of tone ringing signal to the speakers SPKR and the lamp flash signal to the lamps LED1 of the key telephone sets KTS1 and KTS2. Finally, the 0 on lead H disables reset gate 578 and resets current input flip-flop 462 whereby the 60 Hertz timing signal is no longer applied to the advance input AD of the counter 410.

The hold button HO of the key telephone set KTS1 is thereafter released, whereby the hold contact HO reclose and the pickup button PU1 is mechanically released to open pickup contacts PUT1, PUR1, and PUA1. The open pickup contacts PUT1 and PUR1 remove the speech network SN of the key telephone set KTS1 from across the telephone line TL1, while the open pickup contacts PUA1 continue to disconnect the signal lead A1 from its voltage source. Consequently, the line lamps LED1 are only illuminated responsive to the wink clock signal WCLK. The subsystem is thus placed in the hold mode.

Should the party on hold abandon the call, modern central offices drop the connection to the line whereby line current is terminated. However, interruption of line current for 300 msec or less occur in some central offices during normal processing of telephone calls. Thus it is necessary to distinguish between central office cut off of an abandoned call and normal processing.

When line current on the telephone line TL1 is interrupted, line current no longer flows through relay windings CSRT and CSRR of the line current sensor. Relay contacts CS consequently open, resulting in a 1 being applied to lead $\overline{LC}$. This is inverted by input gate 460 to a 0 and applied to lead LC whereupon reset gate 570 is disabled. The counter 410 then advances responsive to the 20 Hertz timing signal applied to advance input AD of the counter by input gate 466.

Should the interruption of the line current be due to something other than central office cut off, line current will be reestablished before 450 msec have expired which is the time necessary for the counter 410 to advance to the count of 9. As soon as line current is again present on relay windings CSRT and CSRR of the loop sensor LCS, relay contacts CS close and 0 is again applied to lead LC. As before, this is inverted by input gate 460 and a 1 applied to lead $\overline{LC}$. Reset gate 570 again applies a 0 to reset gate 572 which in turn applies a 1 to reset input R of the counter 410, and the counter is immediately reset to the 0 count.

If on the other hand central office cut off has occurred, then the counter 410 will advance to the count of 9 at which count a 1 is applied to outputs A and D thereof. Detector gate 490 is thereby enabled and the 0 output of the gate is applied to $\overline{\text{hold}}$ gate 438 of the hold flip-flop 430. The hold flip-flop 430 is then reset whereby a 0 is applied to lead H and a 1 is applied to lead H. The 0 on lead H disables wink driver gate 454, terminating the winking of line lamps LED1 in the key telephone sets KTS1 and KTS2. The 0 on lead H also disables input gate 466, terminating the advancement of counter 410, while the 1 on lead H enables reset gate 578 to reset the counter to 0 count responsive to the next pulse of the 1 Hertz timing signal. In addition, the 0 on lead H disables hold relay driver gate 452 resulting in the deenergization of the hold bridge relay HBR and the removal of the hold bridge from across the telephone line TL1 by the opening of relay contacts HB. Finally, the 1 on lead $\overline{H}$ removes the resetting input to the ring flip-flop 420, flash flip-flop 440, and current input flip-flop 462 and the subsystem is returned to the idle mode.

To place the line on hold back in-use, the pickup button PU1 is again operated whereby contacts PUT1, PUR1, and PUA1 again close. Power is again supplied to the base of buffer transistor 710 via switch hook contacts SHA and pickup contacts PUA1 in series with the signal lead A1, and the transistor turns on whereby a 0 appears on lead A. As described above with respect to the in-use mode, this results in steady illumination of line lamps LED1 in key telephone sets KTS1 and KTS2. The 0 on lead $\overline{A}$ is inverted by reset gate 575 to a 1 and applied to lead A, and since a 1 exists on lead H, reset gate 576 applies a 0 to reset input R′ of the counter 410. The counter 410, is no longer held reset at the 0 count, and it then advances responsive to the 20 Hertz timing signal applied to the advance input AD by input gate 466. When the counter 410 reaches the count of 4, a 1 is applied to output C and this in combination with the 1 on lead A enables detector gate 492. The 0 output of detector gate 492 is applied to $\overline{\text{hold}}$ gate 438 of the hold flip-flop 430, and the hold flip-flop is consequently reset. In the same manner as described above, the 0 on lead H results in the wink clock signal WCLK being removed from the line lamps LED1 of the key telephone sets KTS1 and KTS2 and the hold bridge being removed from across the telephone line TL1. In addition, the 0 on lead H disables input gate 466, terminating the advancement of the counter 410. Furthermore, the 0 on lead H in combination with the 0 on lead $\overline{A}$ resets the counter 410, and the subsystem is returned to the in-use mode.

Although a specific embodiment of the invention has been shown and described, it will be understood that it is but illustrative and that various modifications may be made therein without departing from the scope and spirit of this invention as defined in the appended claims.

What is claimed is:

1. A line control circuit for use in a telephone system comprising the line control circuit, and a telephone line and at least one telephone set associated with the line control circuit, the system having a plurality of operational modes, the line circuit comprising a counter activatable to a plurality of selected states, each of which corresponds to an operational mode of the system;

means responsive to the occurrence of a condition associated with a particular mode for activating the counter to advance toward a corresponding selected state; and means responsive to the advancement of the counter to said selected state for placing the system in a corresponding mode.

2. A control circuit as in claim 1 wherein the condition responsive means advances the counter to a particular selected state only in response to the continuous existence of the associated condition for a predetermined period of time.

3. A control circuit as in claim 1 wherein the system has operational modes of idle and ringing and the condition responsive means advances the counter responsive to the presence of ringing voltage on the associated telephone line while the system is in the idle mode, the counter being advanced to a selected state corresponding to the ringing mode responsive to the continuous presence of ringing voltage on the associated telephone line for a predetermined period of time, and means responsive to the counter advancing to said selected state while ringing voltage is present on the associated telephone line and the system is in the idle mode for applying a ringing signal to the associated set.

4. A control circuit as in claim 1 wherein the system has operational modes of idle and ringing and the condition responsive means advances the counter responsive to the presence of ringing voltage on the associated telephone line while the system is in the idle mode, the counter being advanced to a selected state corresponding to the ringing mode responsive to the continuous presence of ringing voltage on the associated telephone line for a predetermined period of time, and means responsive to the counter advancing to said selected state while ringing voltage is present on the associated telephone line and the system is in the idle mode for applying a lamp flashing signal to the associated set.

5. A control circuit as in claim 4 wherein the system has operational modes of idle, ringing-flashing, and flashing and the means responsive to the couner advancing to said selected state while ringing voltage is present on the associated telephone line and the system is in the idle mode for applying both a ringing and a lamp flashing signal to the associated telephone set.

6. A control circuit as in claim 5 further including means for resetting the counter responsive to the condition responsive means and the counter responsive means, the resetting means resetting the counter responsive to the presence of ringing voltage on the associated telephone line while the system is in the ringing-flashing mode.

7. A control circuit as in claim 6 wherein the condition responsive means advances the counter responsive to the absence of ringing voltage on the associated telephone line while the system is in the ringing-flashing mode, the counter being advanced to a selected state corresponding to the flashing mode responsive to the continuous absence of ringing voltage on the associated telephone line for a predetermined period of time, and means responsive to the counter advancing to said selected state while the system is in the ringing-flashing mode for terminating the application of the ringing signal to the associated telephone set.

8. A control circuit as in claim 7 wherein the condition responsive means advance the counter responsive to the presence of ringing voltage on the associated telephone line while the system is in the flashing mode, the counter being advanced to a selected state corresponding to the ringing-flashing mode responsive to the continuous presence of ringing voltage on the associated telephone line for a predetermined period of time, and means responsive to the counter advancing to said selected state while ringing voltage is present on the associated telephone line for reapplying the ringing signal to the associated telephone set.

9. A control circuit as in claim 7 wherein the condition responsive means advances the counter responsive to the absence of ringing voltage on the associated telephone line while the system is in the flashing mode, the counter being advanced to a selected state corresponding to the idle mode responsive to the continuous absence of ringing voltage on the associated telephone line for a predetermined period of time, and means responsive to the counter advancing to said selected state for terminating the application of the lamp flashing signal to the associated telephone set.

10. A control circuit as in claim 1 wherein the system has operational modes of idle and ringing and the condition responsive means includes means for detecting ringing voltage on the associated telephone line, the ringing detector providing a first signal when ringing voltage is present and a second signal when ringing voltage is absent, and input logic means that advances the counter responsive to the first signal while the system is in the idle mode.

11. A control circuit as in claim 10 wherein the counter is advanced to a selected state corresponding to the ringing mode responsive to the continuation of the first signal for a predetermined period of time, and the counter responsive means includes mode logic means comprising a first detector gate having a unique output responsive to the first signal of the ringing detector and the counter advancing to said selected state while the system is in the idle mode, the unique output serving to set a ring flip-flop, the ring flip-flop in the set condition enabling a ringer driver gate to apply a ringing signal to the associated telephone set.

12. A control circuit as in claim 11 wherein the system has operational modes of idle, ringing-flashing, and flashing and the mode logic means further includes a flash flip-flop that is set responsive to the setting of the ring flip-flop, the flash flip-flop in the set condition enabling a flash driver gate to apply a lamp flashing signal to the associated telephone set.

13. A control circuit as in claim 12 further including logic means for resetting the counter to 0 count responsive to the input logic means and the mode logic means, the reset logic means including a first reset gate for resetting the counter to 0 count responsive to the ring flip-flop being in the set condition and the first signal of the ringing detector.

14. A control circuit as in claim 13 wherein the input logic means advances the counter responsive to the ring flip-flop being in the set condition and the second logic signal of the ringing detector, and the mode logic means includes a second detector gate having a unique output responsive to the flash flip-flop being in the set condition and the counter advancing to a selected state corresponding to the flashing mode, the unique output of the second detector gate serving to reset the ring flip-flop, and the ring flip-flop in the reset condition disabling the ringer driver gate.

15. A control circuit as in claim 14 wherein the input logic means advances the counter responsive to the ring flip-flop being in the reset condition and the first signal of the ringing detector, and the mode logic means includes a third detector gate having a unique output responsive to the first signal of the ringing detector and the counter advancing to a selected state corresponding to the ringing-flashing mode, the unique output of the third detector gate serving to set the ring flip-flop, and the ring flip-flop in the set condition enabling the ringer driver gate to reapply the ringing signal to the associated telephone set.

16. A control circuit as in claim 14 wherein the input logic means advances the counter means responsive to the ring flip-flop being in the reset condition, the flash flip-flop being in the set condition, and the second signal of the ringing detector, and the mode logic means includes a third detector gate having a unique output responsive to the counter advancing to a selected state corresponding to the idle mode, the unique output of the third detector gate serving to reset the flash flip-flop, and the flash flip-flop in the reset condition disabling the flash driver gate.

17. A control circuit as in claim 1 wherein the system has operational modes of in-use and hold and the telephone set includes a signal lead, current being present on both the signal lead and the associated telephone line when the system is in the in-use mode and the signal lead being interrupted when the system is to be placed in the hold mode, and wherein the condition responsive means comprises input logic means including a first input gate for advancing the counter responsive to the presence of line current on the associated telephone line while the system is in the in-use mode and reset logic means including a first reset gate for resetting the counter to 0 count responsive to the presence of current on the signal lead, whereby the presence of both line current and signal lead current results in the counter being continuously reset to 0 count and the termination of signal lead current and continued presence of line current results in the advancement of the counter.

18. A control circuit as in claim 16 wherein the counter is advanced to a selected state corresponding to the hold mode responsive to the continued absence of signal lead current and presence of line current for a predetermined period of time, and the counter responsive means includes mode logic means comprising a first detector gate having a unique output responsive to the continued presence of line current and the counter advancing to said selected state, the unique output serving to set a hold flip-flop, the hold flip-flop in the set condition enabling a hold bridge driver gate to connect a hold bridge across the associated telephone line.

19. The control circuit as in claim 18 wherein the hold flip-flop in the set condition also enables a wink driver gate to apply a lamp winking signal to the associated telephone set.

20. A control circuit as in claim 19 wherein the reset logic means includes a second reset gate for resetting the counter to 0 count responsive to the continued absence of signal lead current, presence of line current, and the hold flip-flop being in the set condition, and the input logic means includes a second input gate for advancing the counter responsive to the hold flip-flop whereby the absence of signal lead current and presence of line current while the system is in the hold mode results in the counter being continuously reset to 0 count and the absence of both signal lead current and line current while the system is in the hold mode results in the advancement of the counter.

21. A line control circuit as in claim 20 wherein the system further has an idle operational mode and the counter is advanced to a selected state corresponding to the idle mode responsive to the continued absence of line current for a predetermined period of time while the system is in the hold mode, and the mode logic means includes a second detector gate having a unique output responsive to the counter advancing to said selected state, the unique output serving to reset the hold flip-flop, and the hold flip-flop in the reset condition disabling the wink driver gate and the hold bridge driver gate.

22. A control circuit as in claim 19 wherein the input logic means includes a second input gate for advancing the counter responsive to the hold flip-flop being in the set condition, and the counter is advanced to a selected state corresponding to the in-use mode responsive to the continued presence of signal lead current for a predetermined period of time while the system is in the hold mode, the mode logic means including a second detector gate having a unique output responsive to the presence of signal lead current and the counter advancing to said selected state, the unique output serving to reset the hold flip-flop, and the hold flip-flop in the reset condition disabling the wink driver gate and the hold bridge driver gate.

* * * * *

UNITED STATES PATENT AND TRADEMARK OFFICE
CERTIFICATE OF CORRECTION

PATENT NO. : 3,920,928

DATED : November 18, 1975

INVENTOR(S) : Stephen W. Lye

It is certified that error appears in the above-identified patent and that said Letters Patent are hereby corrected as shown below:

Column 2, line 68, "an" should read --and--. Column 4, line 13, following "divide" insert --by--; line 13, "stages" should read --stage--; line 45, "T12" should read --TL2--. Column 5, line 5, following "to" add --the--; line 60, following "input" insert --lead--; line 63, "gaet" should read --gate--. Column 6, line 59, following "to" delete "a". Column 7, line 25, following "this" insert --in--. Column 9, line 36, "T11" should read --TL1--; line 49, "20 Hertz" should read --60 Hertz--; line 51, "A" should read --$\overline{A}$--. Column 10, line 31, "head" should read --lead--; line 55, following "and" "flash" should read --$\overline{\text{flash}}$--, following "the" "$\overline{\text{flash}}$" should read --flash--; line 61, "H" should read --$\overline{H}$--. Column 11, line 33, "LC" should read --$\overline{LC}$--; line 34, "$\overline{LC}$" should read --LC--; line 45, "H" first occurrence, should read --$\overline{H}$--; line 49, "H" should read --$\overline{H}$--; line 66, "A" should read --$\overline{A}$--. Column 13, claim 8, line 34, "advance" should read --advances--.

Signed and Sealed this

*twenty-seventh* Day of *April 1976*

[SEAL]

*Attest:*

RUTH C. MASON
*Attesting Officer*

C. MARSHALL DANN
*Commissioner of Patents and Trademarks*